United States Patent [19]

Morgenthaler

[11] 4,376,107

[45] Mar. 8, 1983

[54] PROCESS FOR THE REGENERATION OF SPENT SULFURIC ACID

[76] Inventor: John H. Morgenthaler, 1965 Woodbury Ct., Walnut Creek, Calif. 94596

[21] Appl. No.: 272,685

[22] Filed: Jun. 11, 1981

[51] Int. Cl.³ .................. C10G 17/00; C01B 17/90; C01B 17/74

[52] U.S. Cl. .................. 423/531; 423/525; 423/528; 208/13

[58] Field of Search ............ 423/522, 525, 526, 527, 423/528, 531, 532, 540, 542; 208/13

[56] References Cited

U.S. PATENT DOCUMENTS

| | | | |
|---|---|---|---|
| 1,459,084 | 6/1923 | Bezanson | 423/540 |
| 2,312,756 | 3/1943 | Ferguson | 196/40 |
| 2,406,890 | 9/1946 | Mohr | 423/540 |
| 2,406,930 | 9/1946 | Titlestad | 423/522 |
| 2,417,386 | 3/1947 | Titlestead | 423/522 |
| 3,060,005 | 10/1962 | Litchfield | 23/277 |
| 3,294,650 | 12/1966 | Manteufel | 203/22 |
| 3,359,069 | 12/1967 | Furkert et al. | 423/540 |
| 3,383,171 | 5/1968 | Haeseler et al. | 423/540 |
| 3,477,814 | 11/1969 | Wilson | 23/173 |
| 3,713,786 | 1/1973 | Umstead | 423/531 |
| 3,908,904 | 9/1975 | Kerwer et al. | 423/540 |
| 4,038,212 | 7/1977 | Brockington et al. | 252/436 |
| 4,096,197 | 6/1978 | Mayer | 260/683.47 |
| 4,153,628 | 5/1979 | Gerken et al. | 423/531 |
| 4,256,721 | 3/1981 | Blakey et al. | 423/525 |
| 4,263,234 | 4/1981 | Prudhow et al. | 423/522 |

FOREIGN PATENT DOCUMENTS

| | | | |
|---|---|---|---|
| 1258846 | 1/1968 | Fed. Rep. of Germany | 423/532 |
| 2316534 | 10/1974 | Fed. Rep. of Germany | |
| 2506438 | 8/1976 | Fed. Rep. of Germany | 423/540 |
| 2816469 | 8/1979 | Fed. Rep. of Germany | 423/540 |
| 901089 | 7/1945 | France | 423/522 |
| 49-34598 | 9/1974 | Japan | |
| 49-38998 | 10/1974 | Japan | 423/525 |

OTHER PUBLICATIONS

Labine, "Converting Waste Sludge Acid to $H_2SO_4$," Chemical Engineering, (Jan. 1960), pp. 80–83.

Fasullo, *Sulfuric Acid*, Chapter 5, "Recovery of Sulfuric Acid," (1965).

Sander et al., "Regenerating Spent Acid," *Chemical Engineering Progress*, (Sep. 1978), 57.

*Primary Examiner*—Gary P. Straub
*Attorney, Agent, or Firm*—Frank E. Johnston

[57] ABSTRACT

A gas phase process for the regeneration and concentration of spent sulfuric acid containing oxidizable impurities, which minimizes decomposition of sulfur trioxide to sulfur dioxide comprising: providing one or more reactor vessels containing hot turbulent combustion products; providing a supply of oxygen to the reactor; atomizing into the reactor vessel or vessels the spent sulfuric acid in droplets capable of evaporating in less than several milliseconds whether or not electromagnetic or ultrasonic energy sources are used to augment evaporation, having a particle size smaller than 50 microns, thereby vaporizing the droplets, almost instantaneously, dissociating the spent sulfuric acid into sulfur trioxide and water, and oxidizing the hydrocarbons; maintaining the temperature in the reactor vessel below 1000° C.; removing the resulting mixture to a separate vessel; condensing the water and absorbing the sulfur trioxide to form sulfuric acid; and removing excess water to produce the desired acid concentration.

14 Claims, 2 Drawing Figures

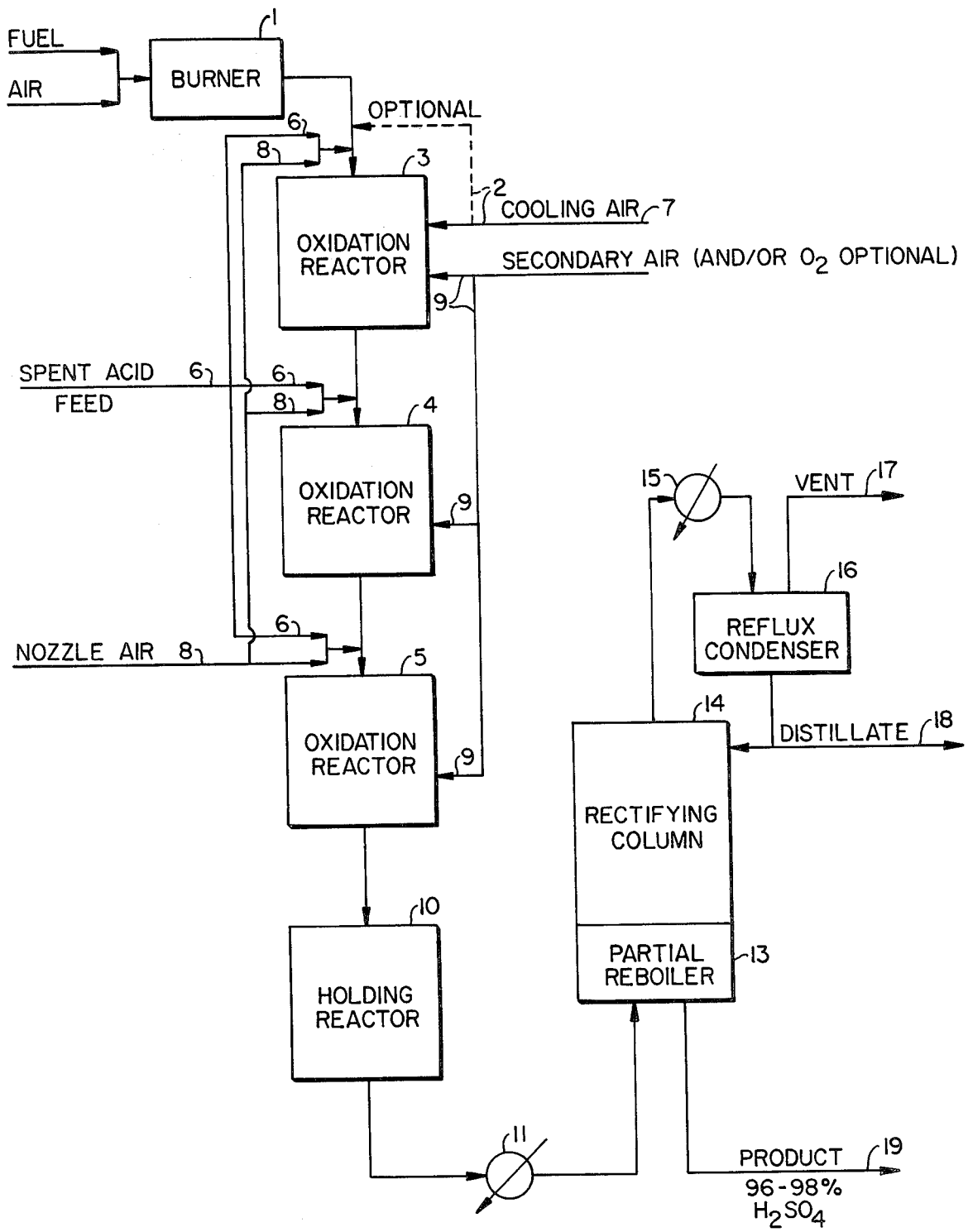
FIG._1.

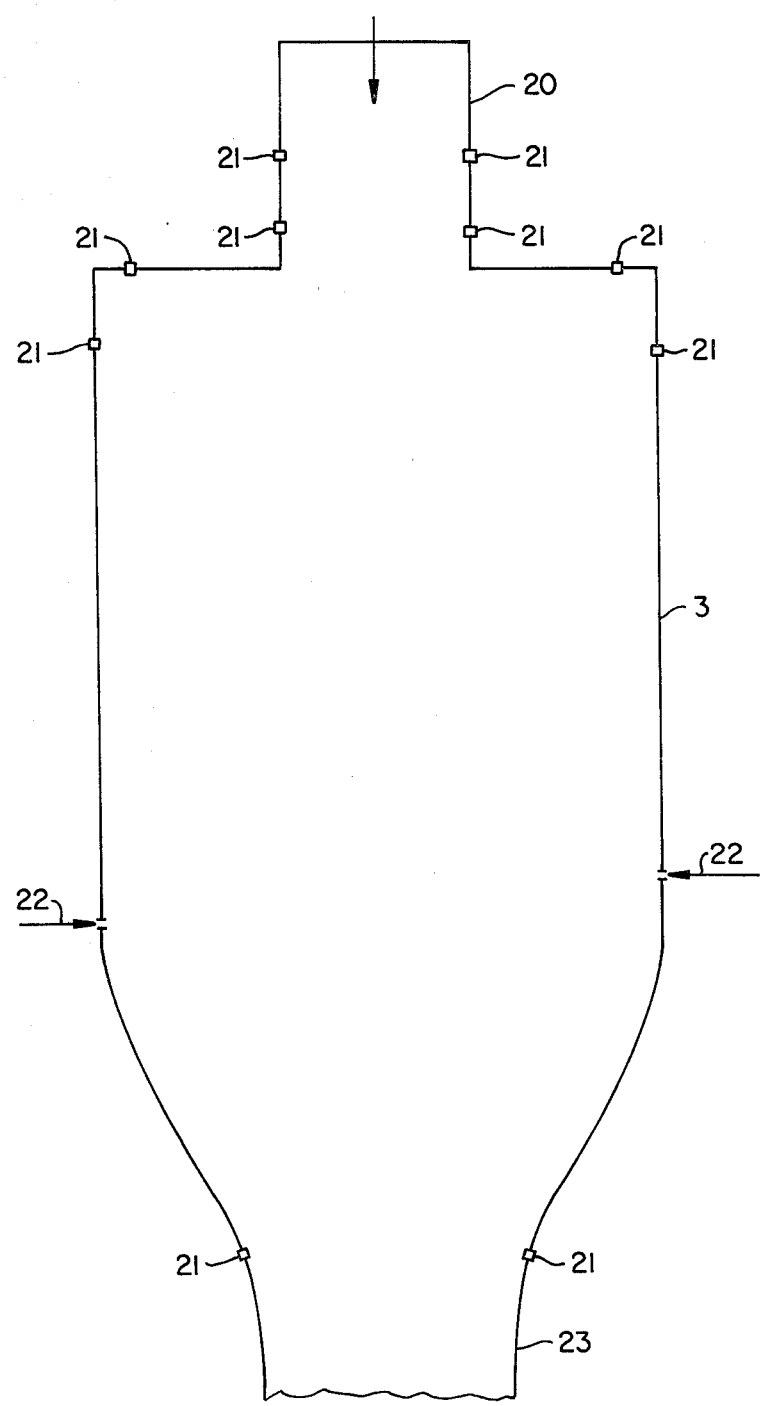
FIG._2.

PROCESS FOR THE REGENERATION OF SPENT SULFURIC ACID

BACKGROUND OF THE INVENTION

This invention relates to a gas-phase process for the regeneration of sulfuric acid, contaminated by organic and other impurities, in which the impurities are oxidized without appreciable decomposition of sulfur trioxide to sulfur dioxide.

Sulfuric acid ($H_2SO_4$) is used in numerous industrial chemical reactions where it is not consumed to form the product but becomes contaminated and requires regeneration. For example, sulfuric acid is frequently used as a catalyst, dehydrating agent or carrying agent.

An enormous quantity of sulfuric acid is used by the petroleum industry as an alkylation catalyst. When sulfuric acid is used as an alkylation catalyst, it becomes contaminated primarily with organic impurities and water. Such contaminated sulfuric acid is frequently referred to as "spent sulfuric acid."

Those skilled in the art have long known that spent sulfuric acid could be regenerated by reactions resulting in the dehydrogenation, cracking, thermal decomposition and oxidation of the hydrocarbons, and decomposition of the acid to sulfur dioxide ($SO_2$). The process is carried out, for example, by injecting large droplets, e.g. up to 1000 microns in diameter, of spent sulfuric acid containing hydrocarbon or organic contaminants into a decomposition furnace heated to 1000° C. or more by combustion of conventional fuels. At furnace conditions vaporization of these large droplets requires several seconds. During this period rapid liquid and gas phase reactions occur between the hydrocarbon and $H_2SO_4$. These reactions can be represented by the following reaction sequence:

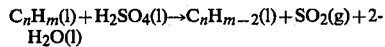

$C_nH_m(l) + H_2SO_4(l) \rightarrow C_nH_{m-2}(l) + SO_2(g) + 2H_2O(l)$

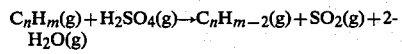

$C_nH_m(g) + H_2SO_4(g) \rightarrow C_nH_{m-2}(g) + SO_2(g) + 2H_2O(g)$

Where n=2 to 30 or more and generally $n < m < 2n+2$. Repeated dehydrogenation ultimately yields carbon (soot) and extensive $SO_2$.

As soon as a droplet of spent acid is vaporized, the sulfuric acid gas begins dissociating to form water and sulfur trioxide according to the reversible reaction:

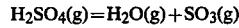

$H_2SO_4(g) = H_2O(g) + SO_3(g)$

Gaseous sulfur trioxide rapidly decomposes into sulfur dioxide and oxygen at temperatures approaching 1000° C. by two well-known reactions. At these temperatures the predominant reaction is the reversible thermal decomposition reaction resulting from molecular collision, represented as:

$SO_3(g) + M(g) = SO_2(g) + O(g) + M(g)$ where $M = N_2, O_2, CO_2, SO_3$, etc.

In the second decomposition reaction atomic oxygen reacts with sulfur trioxide, forming the oxygen molecule, and sulfur dioxide.

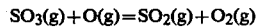

$SO_3(g) + O(g) = SO_2(g) + O_2(g)$

These two gas-phase reactions, both of which are rapid at temperatures above 850° C., complete the reduction of $SO_3$ to $SO_2$ in the furnace.

The $SO_2$ in the effluent gases is catalytically reoxidized to sulfur trioxide ($SO_3$) at about 450° C., which is then absorbed by dilute sulfuric acid solution to regenerate fresh concentrated sulfuric acid.

This well-known process is extremely energy consumptive and costly. It utilizes furnace temperatures in excess of 1000° C. at atmospheric pressure to completely decompose $SO_3$ to $SO_2$ and to oxidize the hydrocarbon impurities. Added energy and process complexity are required to reoxidize the sulfur dioxide. Additionally, this process results in difficult to control emissions requiring extensive abatement.

Although the process has long been known, it was almost always less costly to generate fresh sulfuric acid directly from elemental sulfur. Spent sulfuric acid or sulfate salts were often simply dumped as chemical wastes prior to enactment of pollution control laws.

Spent sulfuric acid, particularly when derived from sulfuric acid alkylation catalyst, typically contains less than twelve percent impurities including water. Thus, if these impurities can be removed in an economical manner, the acid can be recycled thereby reducing consumption of natural resources and eliminating or reducing the cost of regeneration as currently practiced. The most economical method is to oxidize the hydrocarbon impurities without significantly decomposing the sulfuric acid to sulfur dioxide.

It is therefore an object of this invention to regenerate spent sulfuric acid by a process which minimizes the decomposition of $H_2SO_4$ to $SO_2$.

It is another object of this invention to regenerate spent sulfuric acid by a process which conserves energy and substantially reduces the cost of pollution abatement.

It is another object of this invention to recycle through regeneration sulfuric acid used as an alkylation catalyst.

It is another object of this invention to regenerate and concentrate spent sulfuric acid at sufficiently low cost such that higher acid strength can be maintained in the alkylation units, yielding higher octane alkylates, than is economically feasible using fresh acid.

The method of carrying out these objectives is described herein. Although the examples and discussion are based on regeneration of spent sulfuric acid alkylation catalyst, it should be understood that the process is applicable to other types of spent sulfuric acid containing oxidizable and other minor impurities.

SUMMARY OF THE INVENTION

This invention is a gas-phase process for the regeneration of spent sulfuric acid, containing oxidizable impurities, which minimizes decomposition of sulfur trioxide to sulfur dioxide comprising: providing one or more reactor vessels containing hot turbulent combustion products at a temperature below 1000° C.; providing a regulated supply of oxygen to the reactor; atomizing into the reactor vessel or vessels the spent sulfuric acid in droplets sufficiently small so that said droplets are vaporized in less than a few milliseconds; thereby dissociating the spent sulfuric acid into sulfur trioxide and water; maintaining the temperature in the reactor vessel below 1000° C.; oxidizing the hydrocarbons, removing the resulting mixture to a separate vessel; condensing the sulfur trioxide to form sulfuric acid; and removing excess water to produce the desired acid concentrations.

BRIEF DESCRIPTION OF THE DRAWINGS

FIG. 1 is a schematic diagram of a staged reactor system for the regeneration and concentration of spent sulfuric acid according to one embodiment of the process of this invention.

FIG. 2 is a cross-section of one type of reactor vessel.

DESCRIPTION OF DRAWINGS

FIG. 1 is a schematic diagram of one embodiment of the invention. It is not meant to illustrate the process in its particulars or in all embodiments.

Hydrocarbon fuel and air are burned in conventional burner 1. The resulting gaseous combustion products are cooled to less than 1000° C. by evaporation of spent acid and/or by introduction of cool air via line 2. The hot products are then fed to oxidation reactor 3, a portion of these products may be introduced into reactors 4 and 5 if desired.

Portions of atomized spent sulfuric acid are introduced via lines 6 into each of the reactors 3, 4 and 5. A regulated amount of oxygen may be injected via line 7 into reactor 3. Some of the oxygen may be injected into reactor 3 through nozzle lines 8 simultaneously with atomization of the spent acid. A secondary source of oxygen may be provided as needed to reactors 3, 4 and 5 via lines 9.

The gaseous products from the first reactor 3 flow into reactor 4 where they mix with additional spent acid and with additional combustion gases if desired. After reaction the gaseous products from reactor 4 are passed to reactor 5. The contents of reactor 5 are transferred to holding reactor 10 for completion of the oxidation of the organic impurities.

The products of reactor 10 are transferred to a heat exchanger 11 for partial cooling. These gases containing sufficient heat to concentrate $H_2SO_4$ are transferred to a partial boiler 13 where $SO_3$ and $H_2O$ are reassociated. The condensing vapors pass through a rectifying column 14, a heat exchanger 15, and a reflux condenser 16 from which gases are vented at 17 and the distillate is either removed via line 18 or recycled to the rectifying column 14. The product is removed via line 19 as 96-98% $H_2SO_4$.

FIG. 2 of the drawings is a cross section of one type of oxidation reactor. Inlet duct 20 is a relatively narrow passage into which hot combustion gases from burner 1 (FIG. 1) are introduced at start-up and thereafter as required and air or oxygen enriched air is introduced to support combustion of organic materials contained in the spent acid feed. Feed is introduced into the reactor thru nozzles 21 which are located near regions of high turbulence. Injection augments the turbulence. The finely divided feed droplets produced at the nozzles mix very rapidly with the incoming combustion gases and air. Cooling air is introduced at nozzles 22 as required to maintain a suitable reactor temperature. The combustion gases and dissociation products produced in the reactor exit via duct 23, a duct of greater diameter than duct 20. The exit duct 23 serves as the inlet duct to reactor 4 (FIG. 1). The number and positioning of the several nozzles will vary with reactor temperature, pressure, volume, feed thruput and impurity levels in the feed.

DETAILED DESCRIPTION

It has been discovered that spent sulfuric acid can be regenerated by oxidizing its impurities while substantially preventing the decomposition of sulfuric acid to sulfur dioxide by the method described herein. Both liquid and gaseous decomposition of $H_2SO_4$ and its dissociation product $SO_3$ are minimized by (a) very rapidly atomizing and vaporizing the spent acid feed, (b) maintaining the reactor temperature considerably below 1000° C., and (c) carefully controlling residence time.

The process although beginning with liquid spent sulfuric acid is carried out in the gas phase. This is accomplished by injecting air which may contain added oxygen, and atomized micron-size spent sulfuric acid droplets into a high-velocity stream of combustion products, or previously evaporated spent acid and reaction products sufficiently hot and turbulent to cause almost instantaneous vaporization of the droplets and complete dissociation of $H_2SO_4$ to $SO_3$ and $H_2O$.

Reactor conditions, especially temperature and residence time, are carefully controlled so that hydrocarbon oxidation is essentially complete while $SO_3$ decomposition to $SO_2$ is minimal. The rate of gaseous decomposition of $SO_3$ decreases markedly with decreasing temperature; at 750° C. it is only 0.07% and at 650° C., 0.002% of its rate at 1000° C. Important reactor conditions in addition to temperature and residence time are: pressure, concentration of reacting species, and reactor turbulence.

Reactor temperature is the most important independent variable because both hydrocarbon oxidation and $SO_3$ decomposition reaction rates increase very rapidly with increasing temperature. The residence time within a reactor will be primarily determined by temperature. It must be of sufficient duration to permit nearly complete oxidation of the hydrocarbon to carbon dioxide and water. Any increase in residence time beyond this value is detrimental as it merely increases $SO_3$ decomposition to $SO_2$. Since the relative rates of hydrocarbon oxidation and $SO_3$ decomposition reactions vary greatly with temperature in the range from 500° to 1000° C., optimization is possible between reactor temperature, residence time, and spent acid composition, which will result in minimization of $SO_2$ production.

Reactor temperatures of 500° up to about 1000° C., and preferably 600° to 800° C. are suitable in the practice of this invention. When several reactors are used, some variation in temperature between reactors may be beneficial, with the first reactor at a lower temperature than the last. A temperature range about 650° to about 750° C. is preferred.

When using air alone as the oxidizing agent, the adiabatic reactor temperature will frequently not exceed 650° C. Higher temperatures can be achieved in several ways: (1) a fuel may be burned in a conventional furnace and injected turbulently into the reactor(s) through small diameter ducts, or subsonic or even supersonic nozzles, or it may be burned directly in the reactor, (2) oxygen-enriched air may be employed, which because of its reduced nitrogen content, yields higher adiabatic reactor temperatures than air, (3) hot flue gas, cooled as required, can be injected in place of combustion products from the furnace, (4) recycled gaseous products of the regeneration process also could be used. Combinations of various alternatives may be advantageous.

Molecular and atomic oxygen concentrations within the reactor(s) are particularly important. Oxygen-enriched air can be used to increase oxygen concentrations. Hydrocarbon ignition delay time and ignition temperature are reduced, and oxidation rate is increased, by increasing oxygen concentration. Hence for the same residence time, hydrocarbon burnout will be completed at a lower temperature with oxygen enrichment than is possible with air alone. However, at constant temperature and pressure, atomic oxygen concentration increases with increasing molecular oxygen concentration. The rate of gaseous $SO_3$ decomposition decreases rapidly with decreasing temperature and increases with increasing atomic oxygen concentrations. Therefore, minimization of $SO_3$ decomposition should include optimization of reactor temperature and oxygen concentration, which will vary somewhat with feed composition.

It is generally convenient to operate reactors at pressures somewhat above atmospheric pressure. Maximum pressure should probably be no higher than about 10 atmospheres. Since the concentration of reacting species is directly proportional to the total pressure, the rates of competing reactions increase with increasing pressure, but their relative rates of increase differ. At constant temperature and molecular oxygen concentration, the atomic oxygen concentration is inversely proportional to the square root of the total pressure. The rate of increase of the undesirable oxygen-atom reaction, resulting in decomposition of $SO_3$ to $SO_2$, is slower than that of the hydrocarbon oxidation reactions at increasing reactor pressures. Hence reactor pressure is a variable along with temperature, residence time, and oxygen concentration to be used in obtaining optimum reactor conditions. Reactor staging assists in achieving this optimization.

Maintenance of high levels of turbulence throughout the reactors and interconnecting ducts is advantageous for several reasons: (1) temperature and concentration gradients are minimized so that local hot or cold spots will not occur, (2) molecular oxygen and cold air in the feed streams will be immediately diluted by rapidly mixing with reaction products, (3) superequilibrium radical concentrations, including atomic oxygen, which may form during stoichiometric combustion of hydrocarbons will be minimized, (4) droplet burning which leads to soot formation will be suppressed, (5) atomization, droplet breakup and vaporization of the injected spent acid spray are enhanced because of increased shear stresses and improved heat transfer.

Turbulence can be generated within a reactor with a variety of techniques. Often for gases the most practical approach is utilization of judiciously located and oriented high-velocity jets or injectors. Mass entrainment of reaction products by the discharging jets entering the reactor create extensive turbulence and mixing. Either high-velocity subsonic streams at velocities greater than about 100 ft/sec, or supersonic streams at velocities greater than 1200 ft/sec, or a combination of such flows, will create extensive turbulence and mixing in a properly designed reactor.

Gaseous streams that can be used to create turbulence within the oxidation reactors are: reaction products from the auxiliary burner or furnace, products from previous oxidation reactors, cooling air, secondary air, and when used, atomization air.

It is essential in the practice of this invention that very small, cool spent acid droplets be injected into hot, turbulent, gaseous reaction products in a manner that minimizes their evaporation or vaporization time and $H_2SO_4$ dissociation time.

The spent acid should not be heated prior to atomization and injection into the reactor since heating will cause rapid liquid-phase decomposition of the acid into $SO_2$. Preferably, the acid feed should be cooled to or even below room temperature prior to atomization, as long as the liquid viscosity remains sufficiently low to yield very small droplets upon atomization.

The jacket surrounding the atomizer which controls the initial droplet temperature may be maintained at the plant cooling water temperature. However, feed may be heated above ambient temperature, e.g., to about 30° C., if necessary to achieve proper acid viscosity for fine atomization.

Atomization may be accomplished by any of a variety of known techniques, e.g., gas, pressure, and ultrasonic atomization, using two-fluid, pressure or rotary atomizing nozzles.

Two-fluid, air-atomizing nozzles have several advantages over alternative injectors: (1) they produce an extremely fine spray with a smaller mean droplet diameter than most other injectors—except perhaps for the lower capacity ultrasonic atomizers, (2) they can provide a significant portion of the oxygen required for hydrocarbon oxidation, (3) simultaneous introduction of spent acid and air enhances contact between hydrocarbon and oxygen aiding oxidation, (4) high-pressure nozzle air assists in quickly dispersing spent acid spray into hot reaction products, in creating shear stresses on the droplets and turbulence within the reactor (or duct), in minimizing the likelihood of droplet coalescence, and in preventing large quantities of evaporating spray from reducing local gaseous temperatures and evaporation rates.

It is important that the spent sulfuric acid be vaporized as quickly as possible after injection into the reactor vessel. In order to ensure vaporization within a few milliseconds or less, the spent sulfuric acid is injected as an atomized spray into a highly-turbulent, hot, gaseous, high-velocity stream which then enters the reactor, or directly into a portion of the reactor having these characteristics. To accomplish such rapid vaporization, particle sizes should have a mean diameter of less than 50 microns ($\mu$), and preferably less than $20\mu$.

Since the time for droplet evaporation or vaporization is proportional to the square of the drop diameter, evaporation time becomes extremely short; i.e., when drop size is reduced to the micron size range, it is in milliseconds or less.

Droplet evaporation is enhanced by injecting only a relatively small quantity of spray at any particular location compared to the hot reaction products. At many locations the spray is injected into reacting gases with the heat of vaporization supplied by oxidation of impurities contained in previously injected spent acid.

Vaporization rate is enhanced by maintaining the gases in the reactor in a state of turbulence creating shear stress on the droplets. This also maximizes the oxidation reactions which occur as a result of molecular collisions and interactions permitting lower reaction temperatures and shorter residence times to achieve burn out of the organic material.

Vaporization rate also may be enhanced by subjecting the droplets to electromagnetic or acoustic radiation, e.g., microwaves, laser energy, or ultrasonic radiation.

At droplet temperatures near the boiling point of the spent acid, some dissociation of $H_2SO_4$ to $SO_3$ and water occurs even before evaporation is complete. At temperatures greater than about 650° C., $H_2SO_4$ vapors dissociate almost completely.

As soon as the $H_2SO_4$ is dissociated, the rapid reactions between hot $H_2SO_4$ and hydrocarbon or other organic species are precluded. As discussed previously, the reactions by which $SO_3$ can decompose to $SO_2$ are very much slower than those involving $H_2SO_4$. They are also much slower than the hydrocarbon oxidation reactions, at least over the preferred temperature range.

A well-stirred reactor, in which the product withdrawn has the same composition as the reactor holdup, is suitable for oxidizing the hydrocarbon impurities. Turbulence and mixing within such reactors is often achieved by injection of high-velocity streams or jets at appropriate locations. Reactors are shaped to enhance the turbulence created by these jets to maximize mixing.

The "sudden expansion reactor", shown schematically in FIG. 2 is a simple reactor configuration. The small-diameter, high-velocity stream entering the reactor thru the inlet duct discharges into a considerably larger diameter vessel body, generating extensive recirculation, local turbulence, and a reduced axial flow velocity. Near the exit of the reactor the cross-sectional area decreases, accelerating the flow prior to its entering the next reactor. Recirculation and mixing are augmented by appropriate placement of the air inlets and atomizing nozzles. This turbulent region of the reactor is reasonably well stirred. As the flow accelerates near the reactor exit, transition occurs to plug flow.

More sophisticated reactor configurations may be used, some of which will more closely approach a well-stirred condition. However, the key requirements are that significant local temperature and concentration gradients be avoided to the extent possible, and that residence time be adequate for oxidation of the hydrocarbon impurities. As long as these constraints are met, a simple inexpensive reactor design is adequate.

One easy way to assure that these constraints are met is to conduct the oxidation reactions in a series of staged reactor vessels. Auxiliary hydrocarbon fuels may be burned only in the first reactor, in several or all of them, or in a separate furnace. The contents of the reactor remaining after oxidation of hydrocarbon impurities are transferred to successive reactor stages. At each stage additional spent acid is atomized into the reactor or inlet duct, preferably through a multiplicity of nozzles and rapidly mixed with hot reaction products from previous stages. In this configuration the spray is limited to only a small fraction of the quantity of hot gases flowing past the injector nozzle.

The primary advantage of staged reactors over a single reactor is the reduction in spent acid spray concentration and quantity and avoidance of local temperature and concentration gradients. At each successive stage the acid, hydrocarbon impurity, molecular oxygen and oxygen atom concentration will be reduced because the quantity of reaction products continually increases. Superequilibrium concentrations of atomic oxygen will be reduced as atomic and molecular oxygen concentrations decrease, approaching thermal equilibrium. Stoichiometric hydrocarbon combustion would result locally in considerably greater atomic oxygen concentrations. Temperature control and avoidance of gradients also is enhanced as the ratio of feed to reaction products is progressively reduced.

Each reactor remains substantially isothermal because the heat released due to oxidation is approximately balanced by the heat consumed in vaporization of the spent acid and the subsequent rapid dissociation of sulfuric acid to water and $SO_3$.

The total residence time required for complete oxidation of the hydrocarbons is dependent upon several variables, such as temperature, pressure and the concentration of the various reacting species. Residence time is determined by the ratio of reactor holdup to feed rate; holdup is determined by reactor volume, pressure and temperature. Residence time per reactor over the range of preferred conditions specified herein may vary from only a fraction of a second to a number of seconds, and possibly even several minutes at lowest temperatures.

With staged reactors the last reactor(s) may be merely holding vessels to increase overall retention time, if required to complete the oxidation process. At this stage cold air may optionally be added to the reactor to reduce the temperature of the gases quenching $SO_3$ decomposition reactions and supplying additional oxygen to augment hydrocarbon burnout while minimizing $SO_3$ decomposition. Intermediate reactors also could serve as holding reactors to complete interstage oxidation.

Appropriate spray nozzles generally are the simplest means for producing the finely atomized sprays such as are required in this invention. The exact number and location of the nozzles depends on the type of nozzles, their capacity, reactor capacity and the number of reactors involved. There may be only one nozzle and one reactor or hundreds of nozzles and several reactors. Nozzles or injectors should be located either near regions of high turbulence or where local turbulence may be enhanced within the reactor, e.g. by secondary air injection. Alternatively, injection may be into a high-velocity, hot turbulent gaseous stream immediately prior to entering the reactor. Generally, injection from reactor and duct walls is preferred.

The major gaseous constituents in the reaction products are $SO_3$, $H_2O$, $O_2$, $CO_2$, $N_2$ and small amounts of CO and $SO_2$. The heat content of these gases is sufficient to separate excess water from the resulting sulfuric acid formed by absorption of $SO_3$ in solution in a rectification or distillation column.

The excess heat of the gases from the oxidation reactor can be reduced to the desired temperature for distillation or rectification by use of a waste-heat boiler which generates steam.

Alternatively, the gas temperatures may be quickly reduced by dilution with air. This technique has the added advantage of quenching $SO_3$ decomposition reactions although heat recovery is lost and the increase in "inerts" will require an increase in column diameter.

Although any standard type of distillation apparatus may be used, a rectification colmun generally will be advantageous. In this invention the inert gases present, e.g. $N_2$ or formed during the oxidation reaction, e.g. $CO_2$ and $H_2O$, are vented from the reflux condenser at the top of the column. The gases discharged from the vent of the reflux condenser at the top of the column contain $N_2$, $H_2O$, $CO_2$, $O_2$, $SO_2$, and perhaps some CO.

The distillation apparatus should be operated at a total pressure somewhat lower than that in the final oxidation reactor. Optimally, that pressure will be greater than atmospheric pressure for ease of venting.

Table 1 provides an illustrative breakdown of a spent sulfuric acid composition, typical of that which is regenerated by the process of this invention, and of the fuel and air required to achieve a reactor temperature of 750° C. The data is based on a three stage well-stirred reactor system in which the reactor feed is divided between the reactors. No oxygen enrichment is used.

It should be noted that the air input is approximately 2% in excess of the stoichiometric oxygen required for complete hydrocarbon oxidation. This slight excess air is believed to be within the optimum range (e.g., 0 to 10%).

In this particular system there are three sources of air per reactor which combined supply the required oxygen. The primary source is air injected simultaneously with the spent acid through two-fluid, air-atomizing nozzles. The secondary source is air injected into each reactor at various locations at high velocity to complete hydrocarbon oxidation, and increase local turbulence. A third source of air is that required to cool the combustion products generated from stoichiometric combustion of the auxiliary fuel used to achieve a final reactor temperature of 750° C.

TABLE 1

|  | Per Reactor | Total - 3 Reactors |
|---|---|---|
| Spent Sulfuric Acid Composition: |  |  |
| $H_2SO_4$ | 29.667 | 89.000 |
| $H_2O$ | 1.333 | 4.000 |
| $C_{26}H_{48}$[2] | 2.333 | 7.000 |
| Total: | 33.333 | 100.000 |
| Air: |  |  |
| Nozzle injected | 20.0[3] | 60.0 |
| Secondary | 1.7 | 5.1 |
| Cooling Air |  | 38.4 |
| Total: |  | 103.5 |
| Pilot (stoichiometric): |  |  |
| $C_3H_8$[4] |  | 0.93 |
| Air |  | 14.51 |
|  |  | 15.44 |
|  |  | 218.940 |

[1]Based upon regeneration of 100 lbs. of spent sulfuric acid. All figures are in lbs.
[2]Heat of combustion of $C_{26}H_{48}$ assumed 19,500 BTU/lb. The exact molecular structure of the hydrocarbon is not known but $C_{26}H_{48}$ is a reasonable approximation of its make-up.
[3]Assuming 92 psi nozzle air pressure.
[4]Representative auxiliary fuel.

Table 2 provides the material balance for the reactor end products of the hydrocarbon oxidation and sulfuric acid dissociation of the reactor feed of Table 1.

TABLE 2

| Typical Final Reactor Product | | | |
|---|---|---|---|
|  | Lb. | Lb-Moles | Mole Fraction |
| $SO_3$ | 71.56[1] | 0.8945 | 0.1395 |
| $H_2O$ | 30.27 | 1.6817 | 0.2622 |
| $CO_2$ | 25.03 | 0.5689 | 0.0887 |
| $O_2$ | 0.69 | 0.0216 | 0.0034 |
| $N_2$ | 90.52 | 3.2328 | 0.5041 |
| $SO_2$[2] | 0.87 | 0.0136 | 0.0021 |
| TOTALS: | 218.94 | 6.4131 | 1.0000 |

[1]$SO_3$ corresponds to 87.66 lb. $H_2SO_4$.
[2]$SO_2$ production equivalent to 1.5% $H_2SO_4$ decomposition to $SO_2$.

Table 3 provides a material balance for the products of the distillation column used to concentrate the sulfuric acid.

TABLE 3

| Distillation Column Output | | | |
|---|---|---|---|
|  | Lb. | Lb-Moles | Mole Fraction |
| Product: |  |  |  |
| $H_2SO_4$ | 87.595 | 0.8938 | 0.8775 |

TABLE 3-continued

| Distillation Column Output | | | |
|---|---|---|---|
|  | Lb. | Lb-Moles | Mole Fraction |
| $H_2O$ | 2.246 | 0.1248 | 0.1225 |
|  | 89.841[1] | 1.0186 | 1.0000 |
| Distillate: |  |  |  |
| $H_2SO_4$ | 0.065 | 0.00066 | 0.0010 |
| $H_2O$ | 11.924 | 0.6624 | 0.9990 |
|  | 11.989 | 0.66306 | 1.0000 |
| Vent: |  |  |  |
| $CO_2$ | 25.03 | 0.5689 | 0.1483 |
| $O_2$ | 0.69 | 0.0216 | 0.0056 |
| $N_2$ | 90.52 | 3.2328 | 0.8426 |
| $SO_2$ | 0.87 | 0.0136 | 0.0035 |
|  | 117.11 | 3.8369 | 1.0000 |
| TOTAL: | 218.94 |  |  |

[1]97.5% $H_2SO_4$.

REPRESENTATIVE OPERATION OF INVENTION

Representative operations pursuant to the invention are as follows.

Apparatus conforming in substance to FIG. 1 with a capacity of 100 tons/day spent acid feed rate (2.315 lb/sec) is employed. Air atomizing nozzles, such as Spray Systems Company ½ J 89, are operated at an air pressure of 92 psig and a liquid pressure of 60 psig. Flow rates for this type nozzle are 39.4 gal/hr for spent acid and 73.2 standard cubic feet/min. for air—equivalent to mass rates of 0.1643 and 0.0986 lb/sec, respectively. Hence a total of 14 or 15 such nozzles are required.

Prior to start-up the reactor system is preheated with hot gaseous combustion products generated with a conventional furnace or burner. After wall temperatures of at least 750° C. are attained throughout the reactors and ducting, fuel rates to the burner are reduced and high temperature combustion products produced by burning at a stoichiometric air rate. About 0.93 lb. propane, a typical fuel, are consumed per 100 lb. spent acid feed, which is equivalent to 0.02153 lb/sec. The burner operates at 1.5 to 5 atmospheres and produces nearly 2000° C. combustion products. Higher temperatures are attained as desired by enriching the combustion air with oxygen; lower temperatures by diluting with air.

These hot gases are discharged from the burner through a short duct 6 inches in diameter, which is well insulated, into the first reactor at a velocity about 200 ft/sec. This velocity can be varied greatly by merely changing the duct diameter. About 6 to 12 inches from the reactor entrance an air-atomizing nozzle discharges micron-sized spent acid droplets and air into the hot gases at an angle of 45° upstream to the main flow in the duct. A second nozzle similarly positioned, but located about 2 to 4 inches downstream of the first, operates in a like manner. Because of their micron size, droplets are immediately entrained and vaporized by the very hot, high-velocity gases. This nozzle spacing yields a flow time between nozzles of from less than 1 millisecond to up to 2 milliseconds. The hot combustion products supply the heat necessary to evaporate the $H_2SO_4$, $H_2O$, and hydrocarbon contained in the droplets, and dehydrate and dissociate the sulfuric acid to $SO_3$ and $H_2O$. The temperature of the resulting mixed gases will be in the range from 650° to 800° C. as they enter the reactor.

A well-stirred reactor is used for completion of the oxidation of the hydrocarbon contaminant contained in the spent acid, although other reactor types also can be used. Cooling air required to maintain a reactor temperature in the range between 650° and 800° C. at about 0.89 lb/sec is injected into the reactor near its outlet at high velocity, assisting in creating turbulence and mixing within the reactor and supplying some of the oxygen needed for the oxidation. The reactor volume is between 80 and 325 cubic feet, which yields a residence time of between 1 and 4 seconds. The cooling air is injected through several ports at velocities greater than 200 ft/sec. Subsonic nozzles will yield velocities between 200 and 600 ft/sec or greater, while supersonic nozzles will attain velocities in excess of about 1100 ft/sec.

Product exits the first reactor at a relatively high velocity through a 12-inch diameter duct at 100 ft/sec. Velocity variation is achieved, if desired, by varying duct diameter or reactor pressure, or both. Reactors operate at between 1 and 3 atmospheres.

Additional spent acid is injected into this duct through individually located air atomizing nozzles as was done previously. Here the nozzle air has become a substantially smaller fraction of the flow in the exit duct—only about 5% of the duct flow. The evaporating spent acid assists in maintaining a reasonably uniform duct temperature, which would otherwise increase as the oxidation of previously injected hydrocarbon reaches completion. (The final oxidation reaction of CO to $CO_2$ generates a considerable quantity of heat.) About six atomization nozzles are located in this duct connecting the first and second reactors spaced between 6 and 18 inches apart. At a 12-inch spacing and duct velocity of 100 ft/sec, the nozzles are 10 milliseconds "apart," a time more than adequate to vaporize micron-sized droplets in a 650° to 800° C. environment. If desired a small quantity of additional combustion products from the burner may be added to maintain the desired temperature.

The second reactor is designed in a manner similar to the first again allowing hydrocarbon oxidation to continue to near completion. This reactor is larger than the first because the flow rate has been increased. A residence time range from 1 to 4 seconds requires a reactor volume of from about 130 to 550 cubic feet. Of course, residence times larger or smaller merely require larger or smaller reactor volumes. The key requirement is to oxidize the hydrocarbon material almost completely, which determines the optimum residence time. Longer residence times merely increase $SO_2$ production, which is undesirable.

An identical procedure is followed in the third stage of the process. Both duct diameter of the second reactor outlet and the third reactor are larger than previously. The exist duct is 16 inches in diameter and the third reactor volume varies from about 200 to 800 $ft^3$ for a 1 to 4 second residence time. Shorter residence times are possible because most of the flow has already reacted prior to injection of the final six nozzles in the duct connecting the second and third reactors.

In some cases six nozzles may result in too great a cooling load locally in the duct. In such cases the number is simply reduced and additional reactor stages are added or hot gases, e.g. flue gas is added. If the effluent from the final stage is not sufficiently oxidized, an additional "holding" reactor is used to complete the hydrocarbon burnout. Again a 1 to 4 second residence time should be adequate.

Also if desired, smaller air-atomizing or even other types of atomization nozzles can be used. For example, a ¼ J 16 Spraying Systems Company nozzle operating at 40 psig air and 30 psig liquid has flow rates of only 0.32 gal/hr spent acid and 1.25 standard $ft^3$ feet/min. air—equivalent to 0.00133 and 0.00168 lb/sec, respectively. An injection system utilizing this nozzle would require a total of about 1800 nozzles. Such nozzles, which produce an extremely fine spray, could be used in clusters in ducting as well as within reactors.

Composition of the gaseous products leaving the last reactor corresponds closely to that shown in Table 2. These gases contain more than enough heat content to concentrate the $H_2SO_4$ formed when $SO_3$ and water reassociate in the reboiler of the rectifying column. Some heat is removed to produce the desired quality of superheated vapor entering the column. Cooling water or a heat recovery system such as a steam generator may be employed to reduce the heat content. Heat removal depends on the composition of the feed—especially its water content—and the quantity of water formed in combustion of auxiliary fuel, as well as the concentration of the acid product produced.

Only about 0.12 lb/sec secondary (cooling) air is added to the second reactor, none is added to the third in this operation.

Most of the impurities contaminating spent sulfuric acids, particularly those used as alkylation catalysts are removed by oxidation. This includes most organic compounds, hydrocarbons, and some trace metals.

The concentrated acid is recycled immediately to the alkylation units thus avoiding costly transportation and possible decomposition of $H_2SO_4$ to $SO_2$ in storage. Since this process treats fresh spent acid, decomposition of spent acid in storage also is precluded. Typical product from the rectifying column is illustrated in Table 3.

I claim:
1. A process for the regeneration and concentration of spent sulfuric acid containing a substantial amount oxidizable organic impurities, which recovers over 90 percent of the sulfuric acid content of the feed as sulfuric acid while minimizing decomposition of sulfur trioxide to sulfur dioxide comprising:
   (a) providing at least one reactor vessel containing hot turbulent combustion products,
   (b) providing a regulated supply of oxygen to the reactor vessel,
   (c) atomizing spent sulfuric acid into the reactor vessel in droplets having mean droplet diameters less than 50 microns,
   (d) maintaining the temperature in the reactor vessel within the range 500° to less than 800° C.
   (e) withdrawing reaction products containing more than 0% and up to 10% free oxygen from the vessel at a rate such that the residence time of the spent acid mixture in the reactor is limited to that required to substantially complete the oxidation of the organic components,
   (f) removing the resulting mixture from the reactor vessel to a separate vessel and there cooling the mixture to condense water vapor and absorb sulfur trioxide in the condensed water, and
   (g) removing water from the condensate to produce the desired acid concentration.
2. A process according to claim 1 in which the reaction is carried out in a series of staged well-stirred reactor vessels.
3. A process according to claim 1 in which the spent acid is injected into a high velocity stream of the combustion products.

4. A process according to claim 1 in which conventional fuels equal to about 1 weight percent of the spent acid are burned to produce the combustion products.

5. A process according to claim 1 in which the reactor temperature is maintained by using oxygen enriched air to support the combustion of the impurities in the feed.

6. A process according to claim 1 in which the oxygen is supplied to the reactor in the form of oxygen enriched air or as pure oxygen.

7. A process according to claim 1 in which the spent sulfuric acid is atomized into the reactor in droplets having a mean diameter of less than 10 microns.

8. A process according to claim 7 in which the atomized spent acid and oxygen are simultaneously introduced into the reactor.

9. A process according to claim 7 in which the temperature in the reactor vessels is maintained at approximately 650°–750° C.

10. A process according to claim 9 in which the spent acid is at approximately room temperature at the time of atomization into the reactor.

11. A process for regenerating spent sulfuric acid having a substantial content of organic impurities with minimal production of sulfur dioxide during the regeneration which comprises (a) spraying droplets of spent sulfuric acid having mean droplet diameters less than 50 microns into a reaction zone containing hot turbulent free oxygen-containing gas, (b) maintaining the temperature in the reaction zone at a level in the range 600° to less than 800° C. for a residence time no longer than that required to oxidize the organic impurities contained in the droplets to form mainly carbon dioxide and water vapor and the sulfuric acid contained in the droplets is rapidly dissociated to sulfur trioxide and water vapor, and (c) continuously withdrawing reaction products containing more than 0% and up to 10% free oxygen from the reaction zone and cooling them to condense sulfur trioxide and water forming regenerated sulfuric acid.

12. The process defined in claim 1 or 11 wherein the residence time of the spent sulfuric acid in the reaction zone is less than about 4 seconds.

13. A process according to claim 1 or 11 which spent acid is fed directly from alkylation units to the regeneration unit and regenerated sulfuric acid is recycled to the alkylation units.

14. A process according to claims 1 or 11 in which said spent acid is sulfuric acid which has become spent during use as an alkalytion catalyst.

* * * * *